United States Patent
Purdon

(10) Patent No.: US 9,644,772 B2
(45) Date of Patent: May 9, 2017

(54) PIPE INSULATION FITTING COVER

(71) Applicant: Jeffrey Purdon, Millville, MA (US)

(72) Inventor: Jeffrey Purdon, Millville, MA (US)

(73) Assignee: CHILLED WATER FITTINGS INC., Coconut Creek, FL (US)

(*) Notice: Subject to any disclaimer, the term of this patent is extended or adjusted under 35 U.S.C. 154(b) by 670 days.

(21) Appl. No.: 13/661,193

(22) Filed: Oct. 26, 2012

(65) Prior Publication Data

US 2013/0106094 A1 May 2, 2013

Related U.S. Application Data

(60) Provisional application No. 61/551,503, filed on Oct. 26, 2011.

(51) Int. Cl.
| | | |
|---|---|---|
| G09F 3/00 | (2006.01) | |
| F16L 25/00 | (2006.01) | |
| F16L 59/11 | (2006.01) | |
| F16L 59/22 | (2006.01) | |

(52) U.S. Cl.
CPC ............ *F16L 25/00* (2013.01); *F16L 59/11* (2013.01); *F16L 59/22* (2013.01)

(58) Field of Classification Search
CPC .................................. H01B 7/368; F16L 25/00
USPC ............................................ 40/316; 138/178
See application file for complete search history.

(56) References Cited

U.S. PATENT DOCUMENTS

| | | | | |
|---|---|---|---|---|
| 4,139,026 A | * | 2/1979 | Zack .............................. | 138/178 |
| 4,669,509 A | * | 6/1987 | Botsolas ....................... | 138/178 |
| 4,981,630 A | | 1/1991 | Botsolas et al. | |
| 5,915,413 A | * | 6/1999 | Helmsderfer ................. | 137/375 |

\* cited by examiner

*Primary Examiner* — Joanne Silbermann
(74) *Attorney, Agent, or Firm* — Barlow, Josephs & Holmes, Ltd.

(57) ABSTRACT

A shell type fitting cover provided and is formed from a polymer material or a flexible thermoplastic sheet. A continuous gasket is affixed to the peripheral edges of the shell fitting prior to its installation. Preferably the gasket is a flexible, compressible material. The fitting includes a shell having two ends that overlap onto the linear portions of a pipe insulation system and a longitudinal seam that allows the shell to be installed over an existing piping system. A strip of foam gasket material is provided along each of the peripheral edges in order to create a seal where the installed fitting overlaps the linear sections of insulation as well as where the fitting shell overlaps itself at the longitudinal joint.

10 Claims, 5 Drawing Sheets

PIPE INSULATION FITTING COVER

CROSS-REFERENCE TO RELATED APPLICATIONS

This application is related to and claims priority from earlier filed U.S. Provisional Patent Application No. 61/551,503, filed Oct. 26, 2011.

BACKGROUND OF THE INVENTION

The present invention relates to a cover for use in connection with pipe insulation installed onto piping that operates at below ambient temperature. More specifically, the present invention relates to a fitting cover for use with a piping insulation system that includes integrated gasketing to insure an effective moisture resistant seal where the fitting meets the straight sections of insulation.

Pipe fitting covers for angled joints such as elbow joints, tee joints, etc. are already known in the art. There are a number of split jacket housing systems for pipe elbows having sections with overlapping connecting flanges and interengageable ribs and grooves. The difficulty is that pipe fitting covers of the type mentioned above being formed from a pair of semi-circular sections are disadvantageous because they have seams which may split or crack and thereby eventually leak. Unless the pipe insulation, especially at an angled pipe joint is tightly sealed, the pipe insulation customarily used around the pipe can fail due to moisture intrusion, causing undesired energy loss. The pipe system itself may also fail due to corrosion arising from the infiltration of moisture and resultant condensation under the jacketing surrounding the insulation.

More recently, with the development of thermoplastics and other flexible resilient materials, pipe covers have been constructed as one piece units to eliminate the seams of sectioned covers. As can be seen at FIG. 1, the single piece units are formed as a single integral structure having opposed ends which are folded about each other around the inner radius of the angled joint when the cover is wrapped therearound. As used herein, the term "angled joint" means any juncture of at least two pipes which come together at an angle with respect to each other. The most common examples are elbow joints and tee joints (pipes that meet at a 90.degree. angle). Such single piece covers have been made by Proto Corporation, Zeston, Inc. and Speedline Manufacturing Company.

In order to secure the cover about the angled joint, the opposed ends are folded over each other and secured together and to the underlying pipe insulation. Common means of securing the opposed ends together are adhesives or a pair of threaded tacks which are inserted into the opposed corners of the top end of the cover and then inserted into a corresponding portion of the bottom end.

These methods, however, have had limited success. Adhesives are disadvantageous because the opposed ends tend to separate from each other especially when the adhesive cracks due to the often severe temperature and humidity conditions in vicinity of the pipe joint. Further, where these covers overlap onto the adjacent straight sections of insulation, the application of a coating to seal the joint at these locations necessitates significant manual labor. Often the coating still can't be applied continuously around the pipe cover because of its remote location. As a result there is a need for a more thorough and less time consuming method for sealing these joints to prevent moisture infiltration within the system.

There is therefore a need in the pipe insulation industry to provide a pipe cover which is tightly secured about an angled joint and thereby overcomes the problems of previously employed pipe cover systems.

BRIEF SUMMARY OF THE INVENTION

In accordance with the present invention a shell type fitting cover provided is similar in structure to those fittings that are conventional in the prior art and shown at FIG. 1. The shell preferably a formed polymer material or a flexible thermoplastic sheet. The present invention further adds a continuous gasket that is affixed to the peripheral edges of the shell fitting prior to its installation. Preferably the gasket is a flexible, compressible material. More preferably, the gasket is a foam material. More preferably the gasket is formed from closed cell foam that is affixed to the shell using an adhesive material.

The fitting includes a shell having two ends that overlap onto the linear portions of a pipe insulation system and a longitudinal seam that allows the shell to be installed over an existing piping system. A strip of foam gasket material is provided along each of the peripheral edges in order to create a seal where the installed fitting overlaps the linear sections of insulation as well as where the fitting shell overlaps itself at the longitudinal joint.

It is therefore an object of the present invention to provide a single integral structure pipe cover for covering an angled joint such as an elbow joint, tee joint, etc. which provides greater protection against moisture infiltration and is easier and significantly less expensive to install on below ambient temperature pipe systems than known pipe covers. It is another object of the invention to provide a single integral structure pipe cover wherein the peripheral edges thereof have integrated gaskets to thereby prevent moisture infiltration.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
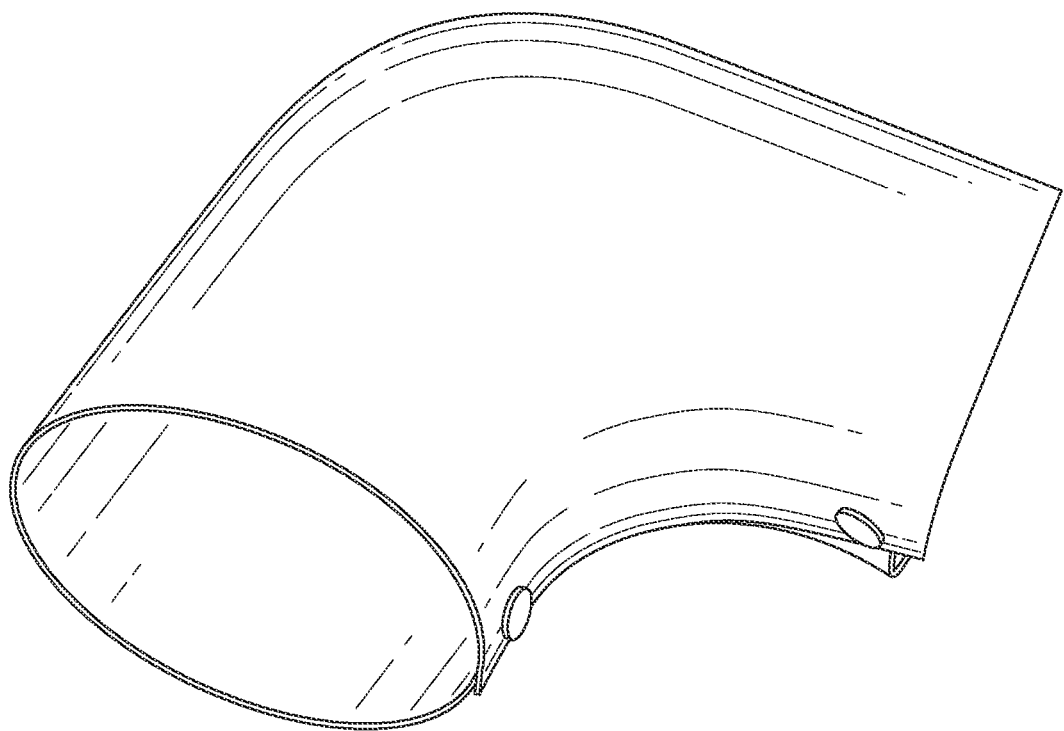
FIG. 1 is a front perspective view of a shell fitting of the prior art.

Now referring to the drawings, an embodiment of the insulation shell fitting of the present invention is shown and generally illustrated in the figures. As can be seen, the insulation shell fitting 10 generally includes a shell body that is configured to encompass the piping joint and the adjacent insulation, and a gasket 12 that serves to seal the shell fitting against moisture infiltration when the shell fitting is in its installed position.

Figure 2:
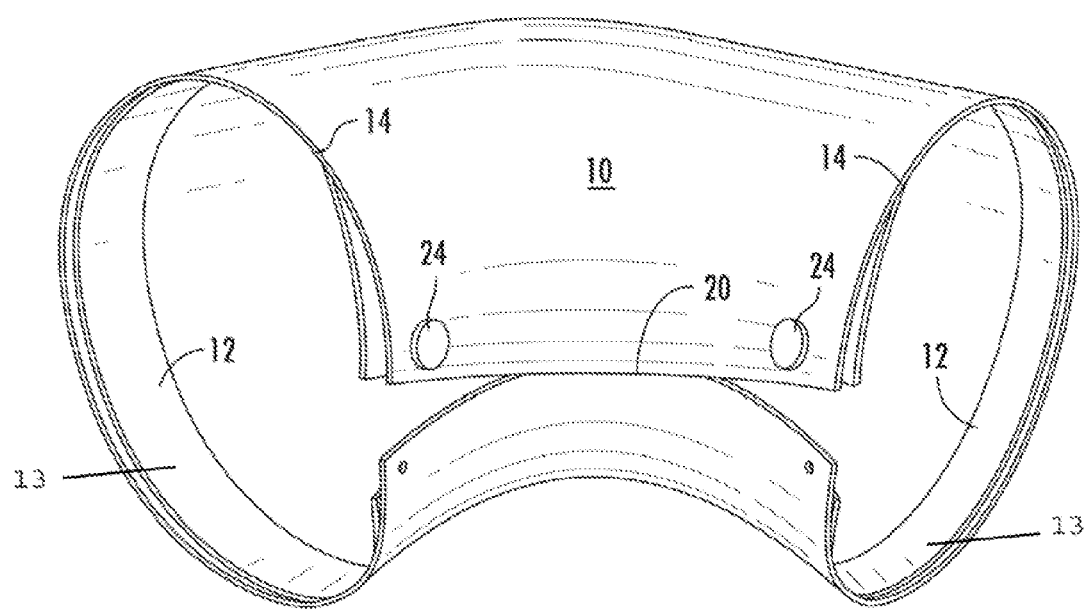
FIG. 2 is a front perspective view of a shell fitting in accordance with the present invention.
Figure 3:
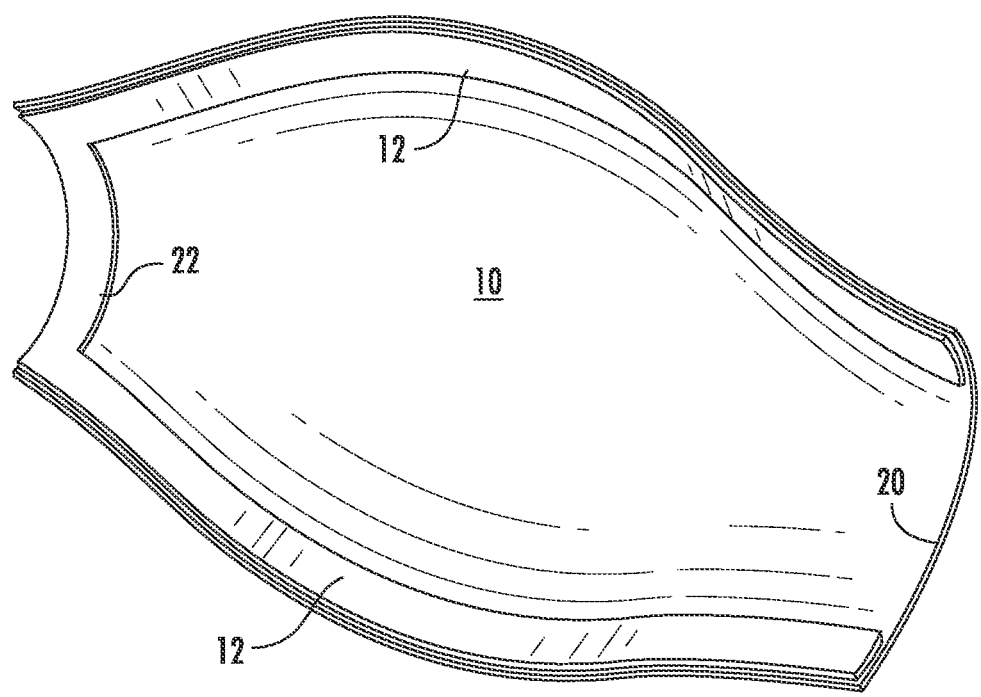
FIG. 3 is the shell fitting of FIG. 2 in an inverted position.

As stated above, the present invention disclosed a shell type fitting cover similar in structure to those fittings that are conventional in the prior art and shown at FIG. 1. In the scope of the present invention as illustrated at FIG. 2, the body of the shell fitting 10 is preferably formed using a polymer material or a flexible thermoplastic sheet. The body of the shell fitting 10 is shaped such a manner that when positioned over the pipe joint, the fitting conforms to the shape and angle of the pipe joint. As can be seen viewing the shell fitting 10 in FIGS. 2 and 3 in combination, the present invention further adds a continuous gasket 12 that is affixed to all of the shell fitting 10 peripheral edges 14 prior to its installation. Preferably the gasket 12 is a flexible, compressible material. More preferably the gasket 12 is a foam material. More preferably the gasket 12 is formed from closed cell foam that is affixed to the shell fitting 10 using an adhesive material.

Figure 4:
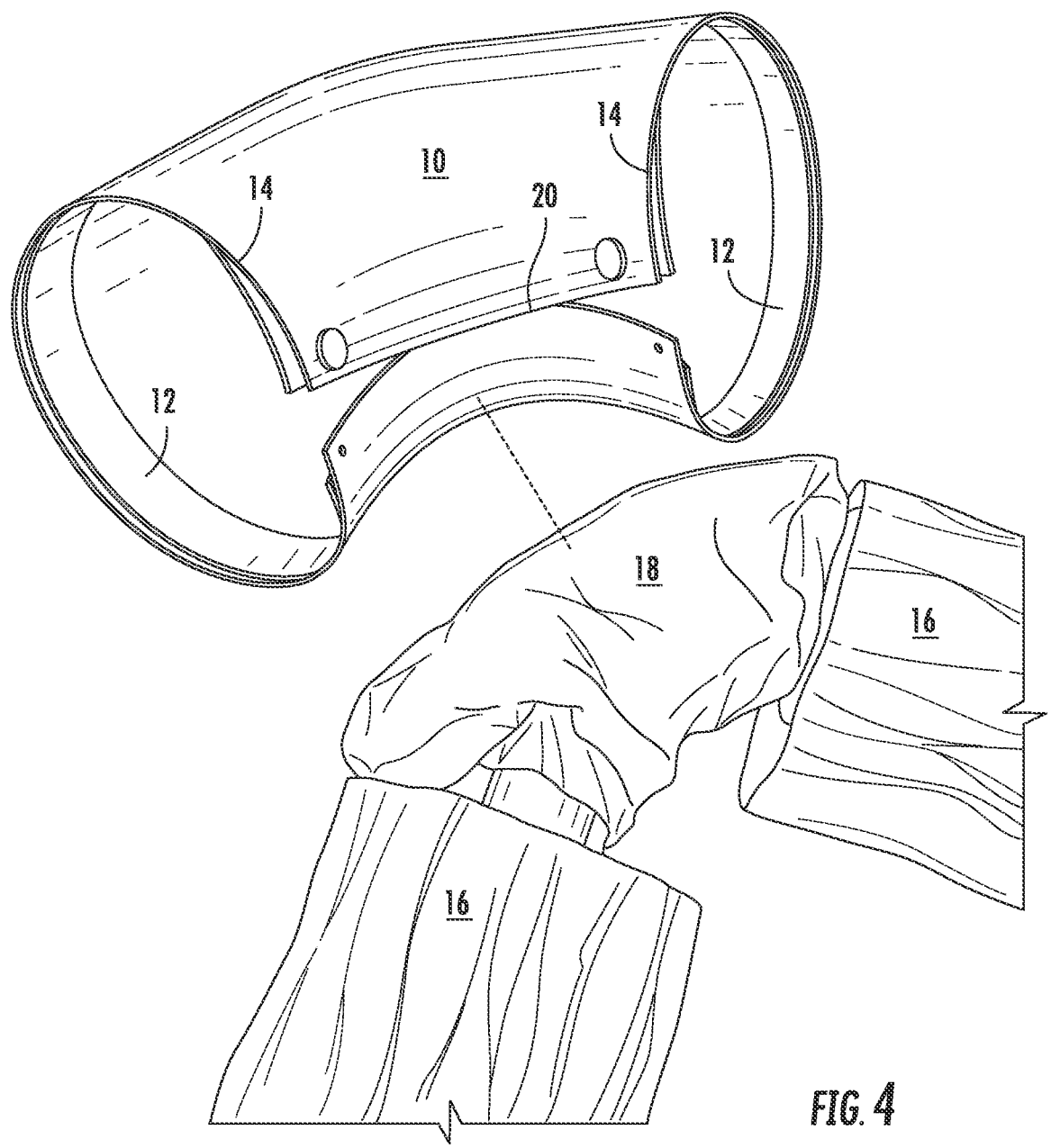
FIG. 4 is a front perspective view of a shell fitting adjacent an angled pipe joint.
Figure 5:
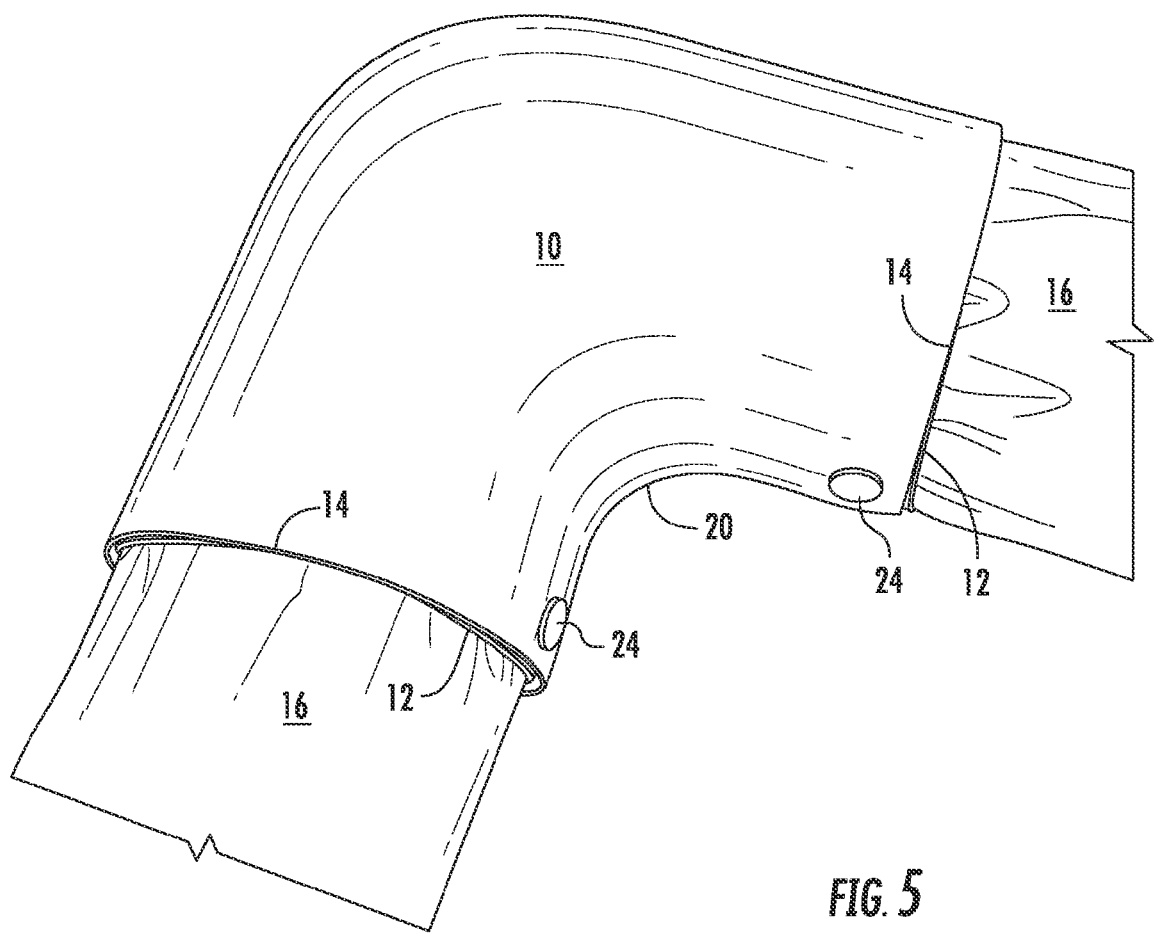
FIG. 5 is a front perspective view of a shell fitting installed onto an angled pipe joint.

Turning now to FIGS. 4 and 5, as can be seen, the shell fitting 10 includes a shell body having two peripheral ends 14 that overlap onto linear portions of a pipe insulation system 16 that is installed adjacent a pipe joint 18 and a longitudinal seam 20 that allows the shell fitting 10 to be opened and installed over an existing piping system. A strip of foam gasket material 12 is provided along each of the peripheral edges 14 in order to create a seal where the installed fitting overlaps the linear sections of insulation 16. An additional strip 22 of gasket material is provided where the shell fitting 10 overlaps itself at the longitudinal joint 20. The shell fitting 10 is installed in the conventional manner. Fasteners 24 such as pins or screws are placed through the shell fitting 10 where it overlaps itself to fasten the shell closed and in the installed position. In this manner the shell fitting 10 forms a seal against the pipe insulation 16 and itself where the shell is closed in order to prevent moisture infiltration.

In another embodiment of the present invention the foam gasket may include adhesive on both sides thereof. A first side allows for the gasket to be affixed to the shell. The adhesive 13 on the other side of the gasket allows the gasket to adhere to the adjacent insulation and to assist with closing the longitudinal joint when the fitting is installed thereby forming an improved seal.

It can therefore be seen that the present invention provides a single integral structure pipe cover for covering an angled joint such as an elbow joint, tee joint, etc. which provides greater protection against moisture infiltration and is easier and significantly less expensive to install on below ambient temperature pipe systems than known pipe covers. Further, the present invention provides a single integral structure pipe cover wherein the peripheral edges thereof have integrated gaskets to thereby prevent moisture infiltration. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A pipe fitting cover for covering an angled pipe joint comprising:
    a shell formed from a flexible resilient material having a shape which is substantially the same shape as an angled pipe joint to be covered, said shell including two peripheral edges that encircle sections of pipe extending from said angled pipe joint and a longitudinal seam extending between said peripheral edges thereby allowing said shell to be opened and installed onto said angled pipe joint; and
    a gasket material installed along said peripheral edges and at said longitudinal seam to form a seal against an outer surface of said sections of pipe.

2. The pipe fitting cover of claim 1, wherein said gasket material is configured and arranged to prevent infiltration of moisture into said shell.

3. The pipe fitting cover of claim 1, wherein said pipe joint operates to transport material at less than ambient temperature.

4. The pipe fitting cover of claim 1, wherein said pipe joint includes insulation installed onto said sections of pipe, said gasket material at said peripheral edges forming a seal with an outer surface of said insulation.

5. The pipe fitting cover of claim 4, further comprising: fasteners installed along said longitudinal seam.

6. The pipe fitting cover of claim 4, further comprising: an adhesive on said gasket material at said peripheral edges and said longitudinal seam.

7. The pipe fitting cover of claim 6, further comprising: fasteners installed along said longitudinal seam.

8. The pipe fitting cover of claim 1, further comprising: an adhesive on said gasket material at said peripheral edges and said longitudinal seam.

9. The pipe fitting cover of claim 1 wherein said gasket material is a material selected from the group consisting of: compressible material, foam and closed cell foam.

10. The pipe fitting cover of claim 1, further comprising: fasteners installed along said longitudinal seam.

* * * * *